United States Patent
Vild et al.

(10) Patent No.: US 7,958,750 B2
(45) Date of Patent: Jun. 14, 2011

(54) GLASS SHEET FORMING SYSTEM

(75) Inventors: Michael J. Vild, Toledo, OH (US); David B. Nitschke, Perrysburg, OH (US); Dean M. Nitschke, Maumee, OH (US); James P. Schnabel, Jr., Holland, OH (US)

(73) Assignee: Glasstech, Inc., Perrysburg, OH (US)

( * ) Notice: Subject to any disclaimer, the term of this patent is extended or adjusted under 35 U.S.C. 154(b) by 692 days.

(21) Appl. No.: 11/255,531

(22) Filed: Oct. 21, 2005

(65) Prior Publication Data
US 2007/0089459 A1 Apr. 26, 2007

(51) Int. Cl.
C03B 23/02 (2006.01)
C03B 23/03 (2006.01)
C03B 23/035 (2006.01)

(52) U.S. Cl. .......................... 65/289; 65/287
(58) Field of Classification Search .......... None
See application file for complete search history.

(56) References Cited

U.S. PATENT DOCUMENTS

| | | |
|---|---|---|
| 3,806,312 A | 4/1974 | McMaster et al. |
| 3,936,291 A | 2/1976 | McMaster |
| 3,947,242 A | 3/1976 | McMaster et al. |
| 3,994,711 A | 11/1976 | McMaster |
| 4,204,854 A | 5/1980 | McMaster et al. |
| 4,222,763 A | 9/1980 | McMaster |
| 4,282,026 A | 8/1981 | McMaster et al. |
| 4,361,432 A | 11/1982 | McMaster et al. |
| 4,404,011 A | 9/1983 | McMaster |
| 4,437,871 A | 3/1984 | McMaster et al. |
| 4,470,838 A | 9/1984 | McMaster et al. |
| 4,512,460 A | 4/1985 | McMaster |
| 4,525,193 A | 6/1985 | McMaster et al. |
| 4,575,390 A | 3/1986 | McMaster |
| 4,661,141 A | 4/1987 | Nitschke et al. |
| 4,662,925 A * | 5/1987 | Thimons et al. ............ 65/104 |
| 4,767,437 A * | 8/1988 | Lampman et al. ............ 65/104 |
| 4,781,745 A | 11/1988 | Mumford |
| 4,946,491 A | 8/1990 | Barr |
| 5,004,491 A | 4/1991 | McMaster et al. |
| 5,092,916 A | 3/1992 | McMaster |
| 5,137,561 A | 8/1992 | Schnabel, Jr. |
| 5,158,592 A | 10/1992 | Buckingham |
| 5,230,728 A | 7/1993 | McMaster |
| 5,330,550 A | 7/1994 | Kuster et al. |
| 5,385,786 A | 1/1995 | Shetterly et al. |
| 5,472,470 A | 12/1995 | Kormanyos et al. |
| 5,900,034 A | 5/1999 | Mumford et al. |
| 5,906,668 A | 5/1999 | Mumford et al. |
| 5,917,107 A | 6/1999 | Ducat et al. |
| 5,925,162 A | 7/1999 | Nitschke et al. |
| 6,032,491 A | 3/2000 | Nitschke et al. |
| 6,079,094 A | 6/2000 | Ducat et al. |
| 6,173,587 B1 | 1/2001 | Mumford et al. |
| 6,418,754 B1 | 7/2002 | Nitschke et al. |
| 6,718,798 B2 | 4/2004 | Nitschke et al. |
| 6,729,160 B1 | 5/2004 | Nitschke et al. |

* cited by examiner

Primary Examiner — Jason L. Lazorcik
(74) Attorney, Agent, or Firm — Brooks Kushman P.C.

(57) ABSTRACT

A system (10) and method for forming glass sheets includes a forming station (14) having lower and upper molds (28, 30) between which glass sheets G are cyclically received from a furnace (12) on a vacuum transfer platen (34), formed between the lower and upper molds (28, 30), and transferred to a delivery mold (42) for delivery such as to a quench station (16). The vacuum transfer platen (34) and the delivery mold (42) are moved at different elevations and operated by a controller (18) for movement into the forming station (14) in respective underlapping and overlapping relationships to each other so each glass sheet forming cycle can begin within the forming station before the prior forming cycle is completed in a time overlapping manner that reduces the cycle time.

14 Claims, 3 Drawing Sheets

GLASS SHEET FORMING SYSTEM

BACKGROUND OF THE INVENTION

1. Field of the Invention

This invention relates to a system for forming glass sheets.

2. Background Art

Glass sheets are conventionally formed by heating on a conveyor within a furnace and then forming within a heated chamber prior to delivery for cooling. Such cooling can be slow cooling to provide annealing or faster cooling that provides heat strengthening or tempering. In connection with heating of the glass sheets, see United States Patents: U.S. Pat. No. 3,806,312 McMaster et al.; U.S. Pat. No. 3,947,242 McMaster et al.; U.S. Pat. No. 3,994,711 McMaster; U.S. Pat. No. 4,404,011 McMaster; and U.S. Pat. No. 4,512,460 McMaster. In connection with glass sheet forming, see United States Patents: U.S. Pat. No. 4,282,026 McMaster et al.; U.S. Pat. No. 4,437,871 McMaster et al.; U.S. Pat. No. 4,575,390 McMaster; U.S. Pat. No. 4,661,141 Nitschke et al.; U.S. Pat. No. 4,662,925 Thimons et al.; U.S. Pat. No. 5,004,491 McMaster et al.; U.S. Pat. No. 5,330,550 Kuster et al.; U.S. Pat. No. 5,472,470 Kormanyos et al.; U.S. Pat. No. 5,900,034 Mumford et al.; U.S. Pat. No. 5,906,668 Mumford et al.; U.S. Pat. No. 5,925,162 Nitschke et al.; U.S. Pat. No. 6,032,491 Nitschke et al.; U.S. Pat. No. 6,173,587 Mumford et al.; U.S. Pat. No. 6,418,754 Nitschke et al.; U.S. Pat. No. 6,718,798 Nitschke et al.; and U.S. Pat. No. 6,729,160 Nitschke et al. In connection with the cooling, see United States Patents: U.S. Pat. No. 3,936,291 McMaster; U.S. Pat. No. 4,470,838 McMaster et al.; U.S. Pat. No. 4,946,491 Barr; U.S. Pat. No. 5,385,786 Shetterly et al.; U.S. Pat. No. 5,917,107 Ducat et al.; and U.S. Pat. No. 6,079,094 Ducat et al.

During the forming process, the heated glass sheets can be supported by a vacuum generated at a downwardly facing mold whose initial support of the glass sheet upon being received from a heating conveyor can be assisted by an upwardly directed heated gas flow that can be provided by gas jet pumps, such as disclosed by United States Patents: U.S. Pat. No. 4,204,854 McMaster et al. and U.S. Pat. No. 4,222,763 McMaster.

For effective high yield glass sheet forming, it is important for cooperable molds to be properly positioned upon mounting and aligned with each other during each cycle of operation therebetween, which is made more difficult due to the heated environment in which the glass sheet forming takes place. See, U.S. Pat. No.: 4,781,745 Mumford; U.S. Pat. No. 5,158,592 Buckingham; U.S. Pat. No. 5,092,916 McMaster; and U.S. Pat. No. 5,230,728 McMaster. The heated environment also makes it more difficult to change molds between different production runs that cannot utilize the same molds. See U.S. Pat. No. 5,137,561 Schnabel, Jr. which discloses changing a cloth ring on a glass sheet heating furnace.

After forming, heat strengthening or tempering can be performed by rapid cooling at a quench section between lower and upper quench modules thereof and may have provision for transferring the glass sheet during such cooling by blowing a greater amount of gas upwardly so as to permit the associated quench ring that carries the glass sheet to move back to the heated forming station in preparation for the next cycle. See U.S. Pat. No. 4,361,432 McMaster et al.

All of the above cited patents are hereby incorporated by reference.

SUMMARY OF THE INVENTION

An object of the present invention is to provide an improved glass sheet forming system.

In carrying out the above object, a glass sheet forming system constructed in accordance with the invention includes a furnace having a heating chamber in which a horizontal conveyor is located to convey glass sheets through the furnace along a direction of conveyance for heating to a forming temperature. A forming station of the system cyclically forms heated glass sheets. The forming station includes a lower mold of the ring type and an upper mold located above the lower mold and having a downwardly facing full surface forming face at which a vacuum can be drawn. A vacuum transfer platen of the system is mounted for horizontal movement and has a downwardly facing surface at which a vacuum can be drawn to receive and support a heated glass sheet in contact with the downwardly facing surface. The system includes a first actuator that moves the vacuum transfer platen horizontally between (a) a receiving position within the furnace above the conveyor from which the downwardly facing surface of the vacuum transfer platen receives and supports a heated glass sheet in contact therewith, and (b) a delivery position within the forming station below the upper mold and above the lower mold to deliver the heated glass sheet onto the lower mold. A second actuator of the system moves the upper mold upwardly and downwardly. The second actuator moves the upper mold upwardly so the vacuum transfer platen can be moved to the delivery position to deliver the heated glass sheet onto the lower mold. Then, the vacuum transfer platen is moved back to the receiving position within the furnace and the second actuator moves the upper mold downwardly to press form the heated glass sheet between the lower and upper molds. Thereafter, the second actuator moves the upper mold upwardly and the upper mold supports the formed glass sheet by vacuum drawn at its downwardly facing full surface forming face. A delivery mold of the system is movable horizontally at an elevation above the elevation of the vacuum transfer platen and below the elevation of the upwardly moved upper mold. A third actuator of the system initially moves the delivery mold to the forming station to receive the formed glass sheet from the upwardly moved upper mold and subsequently moves the delivery mold and the formed glass sheet thereon from the forming station for delivery. A controller controls the actuators so the movement of the vacuum transfer platen into the forming station begins before the delivery mold is fully moved out of the forming station such that both the vacuum transfer platen and the delivery mold as well as the glass sheets thereon are at least partially in the forming station at the same time and respectively in underlapping and overlapping relationships with respect to each other whereby one cycle commences within the forming station before the prior cycle is completed to decrease glass sheet forming cycle time.

The glass sheet forming system as disclosed includes a quench station to which the formed glass sheet is delivered by the delivery mold for quenching.

A lift jet nozzle assembly lifts the heated glass sheet from the conveyor to the downwardly facing surface of the transfer platen.

The downwardly facing surface of the transfer platen has a slight downwardly convex shape and includes a high temperature cloth covering against which the heated glass sheet is supported for its transfer from the furnace to the forming station.

The forming station of the system includes a heated forming chamber in fluid communication with the heating chamber of the furnace.

The glass sheet forming system also includes a lower mold tilt support mechanism.

Preferably, the controller operates the system so the heated glass sheet is delivered to the lower mold at approximately the same time the delivery mold receives the formed glass sheet processed during the prior cycle. The controller also operates the system so the transfer platen can receive the heated glass sheet from the conveyor while the glass sheet is stationary or while the glass shee is being conveyed. In addition, the controller operates the system so the full surface upper mold is moved downwardly to deliver the formed glass sheet onto the delivery mold and then moved back upwardly so the delivery mold can be moved from the forming station for delivery.

The lower mold has upper extremities at generally the same elevation, and each upper extremity is located about 0.2 to 2 centimeters, and preferably about 0.2 to 0.6 centimeter, below the glass sheet just before the glass sheet is released from the transfer platen onto the lower mold.

The objects, features and advantages of the present invention are readily apparent from the following detailed description of the preferred embodiment when taken in connection with the accompanying drawings.

DETAILED DESCRIPTION OF THE PREFERRED EMBODIMENT

Figure 1:
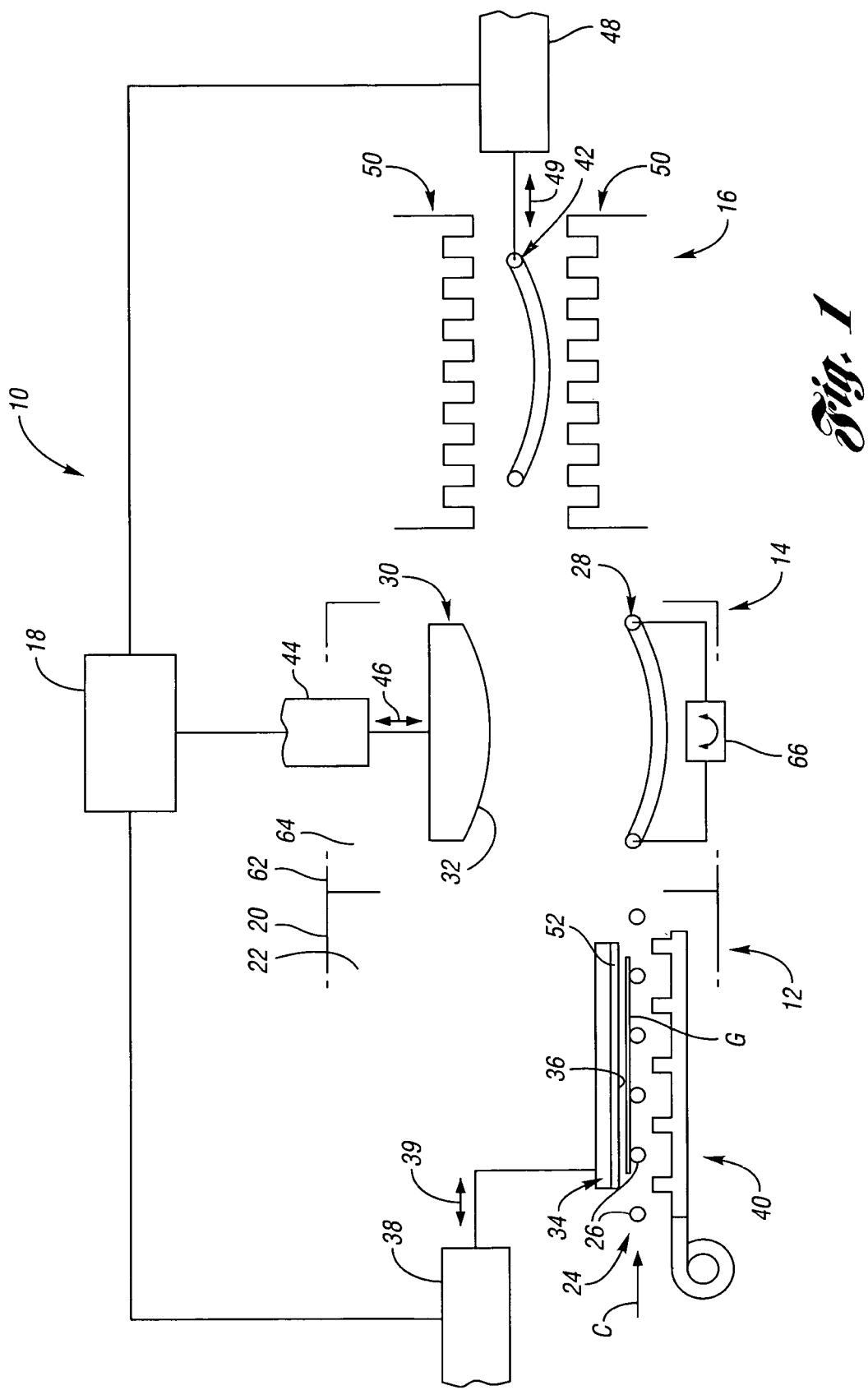
FIG. 1 is a schematic view of a glass sheet forming system constructed in accordance with the invention and is shown at an initial position prior to any glass sheet forming.

With reference to FIG. 1, a glass sheet forming system constructed in accordance with the invention is generally indicated by 10 and includes a schematically indicated furnace 12, a forming station 14, and a quench station 16 to which the formed glass sheets are delivered. A controller 18 of the system coordinates the operation of the furnace 12, the forming station 14 and the quench 16.

With continued reference to FIG. 1, the furnace 12 is of any conventional type including an insulated housing 20 that defines a heating chamber 22 in which a roll conveyor 24 is located. The roll conveyor 24 includes conveyor rolls 26 on which glass sheets G are conveyed at spaced intervals in a direction of conveyance as shown by arrow C for heating to a forming temperature.

The forming station 14 of the system 10 cyclically forms heated glass sheets G as is hereinafter more fully described. This forming station 14 includes a lower mold 28 of the ring type and an upper mold 30 having a downwardly facing surface 32 that provides a forming face at which a vacuum can be drawn as is hereinafter more fully described.

Figure 2:
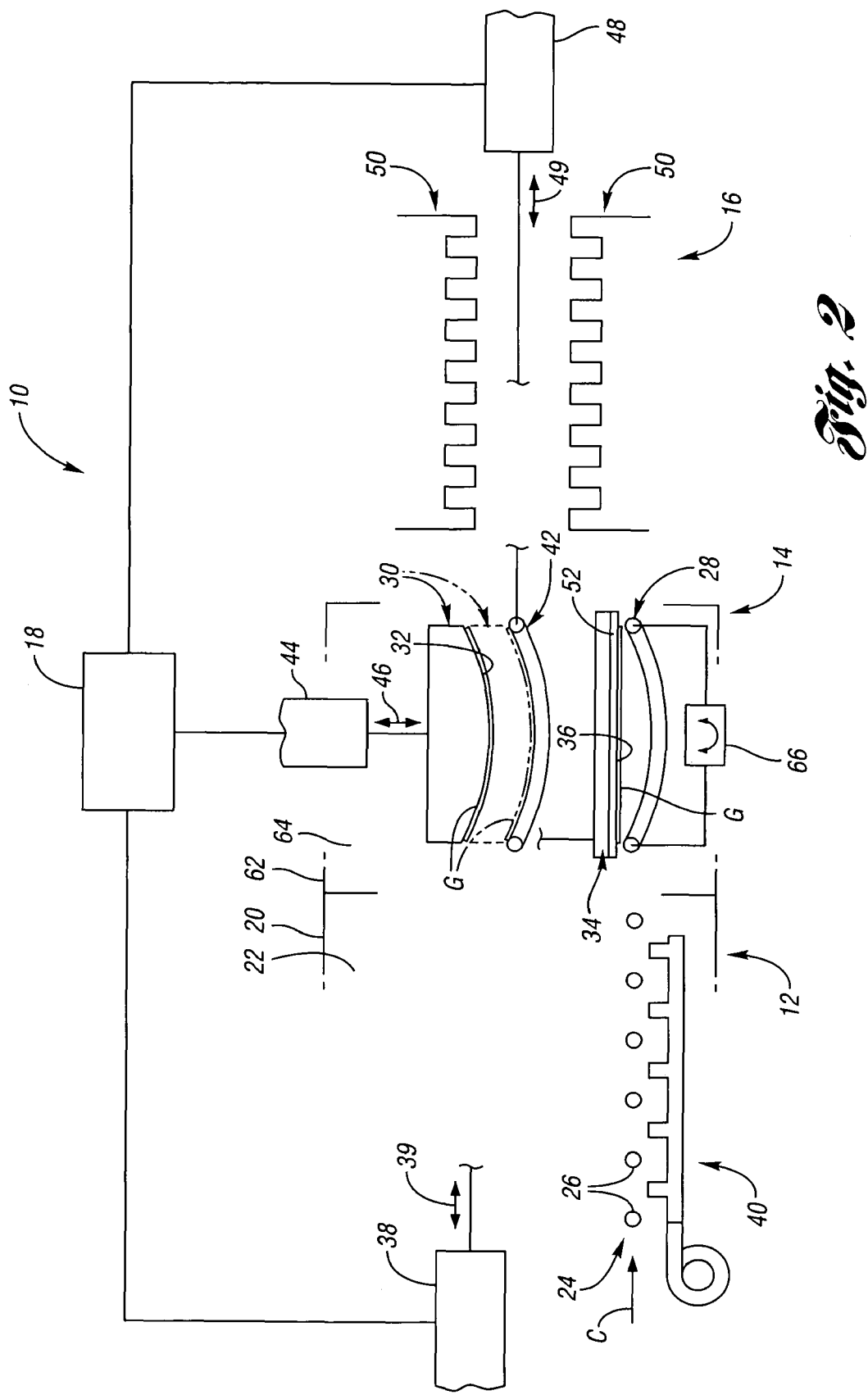
FIG. 2 is a view similar to FIG. 1 shown as one glass sheet forming cycle is almost completed and as another forming cycle is commencing.
Figure 3:
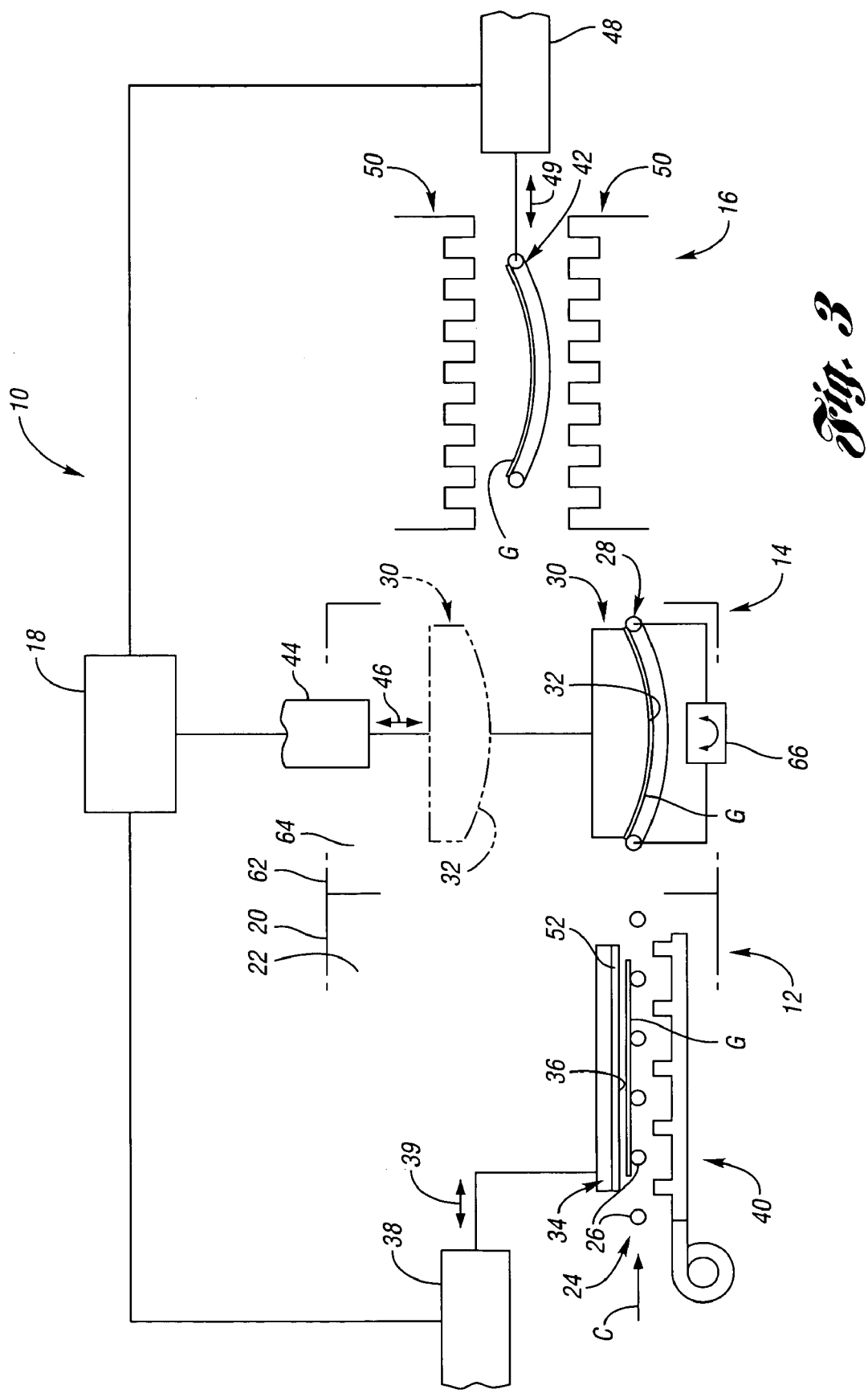
FIG. 3 is a view similar to FIG. 2 at a later stage after the one glass sheet has been delivered and the other is in the process of being formed and as a third glass sheet is being readied for a further forming cycle.

A vacuum transfer platen 34 of the system 10 is mounted for horizontal movement and has a downwardly facing surface 36 at which a vacuum is drawn to receive and support a heated glass sheet. A first actuator 38 of the system moves the vacuum transfer platen 34 horizontally as shown by arrows 39 between a receiving position within the furnace 12 as shown in FIG. 1 and a delivery position within the forming station 14 as shown in FIG. 2. The vacuum transfer platen 34 when located by actuator 38 in the receiving position of FIG. 1 receives a heated glass sheet G from the conveyor by a differential gas pressure applied to the glass sheet. More specifically, a vacuum is drawn at the downwardly facing surface 36 of the vacuum transfer platen 34 and a lift jet assembly 40 can be utilized to provide an upward gas flow so that the glass sheet G is transferred upwardly from the roll conveyor 24 into supported contact with the downwardly facing surface of the vacuum transfer platen. The first actuator 38 then moves the vacuum transfer platen 34 and the glass sheet G supported thereby from the receiving position of FIG. 1 within the furnace 12 to the delivery position of FIG. 2 within the forming station 14 above the lower mold 28 and below the upper mold 30. The vacuum transfer platen 34 then delivers the flat glass sheet G onto the lower mold 28 to commence the forming. The vacuum transfer platen 34 is then moved by the first actuator 38 back to the receiving position within the furnace as shown in FIG. 1 and a delivery mold 42 is moved horizontally from the forming station 14 as shown in FIG. 2 to the quench station 16 as shown in FIG. 3. This movement of the delivery mold 42 delivers a previously formed glass sheet, as is hereinafter more fully described, so that the forming of the next glass sheet G can proceed as shown in FIG. 3. More specifically, a second actuator 44 of the system moves the upper mold 30 upwardly and downwardly as shown by arrows 46. The upper mold 30 is moved upwardly to the position of FIG. 2 so the glass sheet can be received from the vacuum transfer platen 34 by the lower mold 28 and is moved downwardly from the higher phantom line position of FIG. 3 to the lower solid line position to press form the glass sheet between the lower and upper molds. A vacuum is drawn at the lower surface 32 of the upper mold 30 to support the glass sheet G on the upper mold, and the second actuator 44 moves the upper mold upwardly to the FIG. 2 position in preparation for delivery of the formed glass sheet and commencement of the next cycle by delivery of the next glass sheet to the lower mold as described above. The vacuum drawn at the upper mold lower surface 32 can also assist in the press foiming of the glass sheet between the molds.

As shown in FIGS. 2 and 3, the delivery mold 42 is moved horizontally by a third actuator 48 as shown by arrows 49 between the forming station 14 and the quench station 16. In the forming station 14, the delivery mold 42 receives the formed glass sheet from the upper mold 30 upon reduction or complete termination of its vacuum. Furthermore, the upper mold 30 can be moved downwardly as shown by phantom line representation in FIG. 2 closer to the delivery mold 42 so that the formed glass sheet only drops a small distance as it is received by the delivery mold from the upper mold. Thereafter, the upper mold 30 is moved upwardly and the delivery mold 42 is moved from the forming station 14 to the quench station 16 between lower and upper quench heads 50 that supply quenching air for rapid cooling of the glass sheet for tempering or heat strengthening. It should be appreciated that the delivery mold can also be used to provide delivery of the formed glass sheet for annealing when annealed formed glass is to be produced.

Both the vacuum transfer platen 34 and the upper mold 30 can be initially supplied with a greater vacuum that is then reduced to prevent undesired deformation of the glass sheet, and further vacuum reduction or complete termination of the vacuum then releases the glass sheet. Furthermore, it is also possible for the vacuum transfer platen 34 and the upper mold 30 to be supplied with positive pressure gas to release the glass sheet therefrom during the processing as described above.

As shown in FIG. 2, the delivery mold 42 is movable at an elevation above the elevation of the transfer platen 34 and below the elevation of the upwardly moved upper mold 30 so both the transfer platen and the delivery mold can be located in the forming station at the same time in respective underlapping and overlapping relationships to each other at least partially or fully to decrease glass sheet forming cycle time. More specifically, successive glass sheet forming cycles can be performed within forming station 14 in a time overlapping manner due to the support and movement of the transfer platen 34 and delivery mold 42 at different elevations so they do not interfere or obstruct each other and can thus be at least partially or fully aligned in their respective underlapping and overlapping relationships to each other. Thus, one forming cycle can start in the forming station before the prior cycle is completed to thereby decrease the cycle time of the system. As shown in FIG. 2, controller 18 operates the system so the next glass sheet G to be formed is received by the lower mold 28 from the transfer platen 34 at approximately the same time the previously formed glass sheet G is delivered from the upper mold 30 to the delivery mold 42. In many applications, both transfers will not take place at the same time, but both the transfer platen 34 and the delivery mold 42 will be at least partially within the forming station 14 at the same time with the transfer platen at least partially below the delivery mold and with the delivery mold at least partially above the transfer platen in a manner that decreases the forming cycle time as compared to systems wherein each cycle has to be fully completed within the forming station before the next cycle can start because the molds interfere and obstruct each other.

The downwardly facing surface 36 of the transfer platen 34 may be flat but preferably has a slight downwardly convex shape. More specifically, the downwardly facing surface 36 may have a relatively large radius of curvature such that a glass sheet having a length of about 1.5 meters will have its central location displaced downwardly by about 2 centimeters from a straight line through its ends. A covering 52 of a high temperature cloth, that may be knit, woven or felt and made from fiberglass or stainless steel, is clamped at its periphery or otherwise secured to cover the downwardly facing surface 36, and this covering does not sag downwardly from the surface due to its downwardly convex shape. The slight downwardly convex shape of the transfer platen surface 36 eliminates the necessity to bond a mold covering to the platen surface and the consequent cost and fabrication time. Such mold coverings protect the heated glass sheets from marking or other distortions during the processing. Also, the downwardly convex shape of the platen surface 36 is preferably cylindrical as opposed to curvatures in transverse directions. More specifically the cylindrical downwardly convex shape provides a lower extremity as a line, as opposed to transverse curvatures that provide a point, and thereby reduces the pressure applied to the glass sheet and consequent deformation upon pickup from the conveyor.

As shown in FIGS. 1-3, the forming station 14 includes a schematically indicated insulated housing 62 that defines a heated forming chamber 64 that is in fluid communication with the furnace heating chamber 22. The forming station 14 may be manufactured as a separate unit whose forming chamber 64 is in fluid communication with the downstream end of the furnace housing 20 or may be manufactured as part of the downstream end of the furnace. Also, the lower and upper molds 28 and 30 may have a major curvature in one direction and a minor curvature in a transverse direction to the major curvature, and the major curvature can be transverse to the direction of conveyance C instead of along the direction of conveyance as shown. In addition, while the forming station 14 and quench station 16 are shown as being aligned along the direction of conveyance C, it is also possible for the forming station and/or the quench station to be located to one lateral side of the system so that the glass sheet executes a 90 degree turn during its processing. As previously mentioned, it is also possible for the system to be utilized to provide glass sheet annealing.

As shown in FIGS. 1-3, the lower mold 28 of the forming station 14 includes a tilt mechanism 66 which allows the lower mold to be tilted after receiving the heated glass sheet. The glass sheet is initially dropped onto the upper extremities of the lower mold with generally the same drop height at each upper extremity. The lower mold with the glass sheet thereon is then tilted and the glass sheet is formed between the molds in its tilted attitude. Thereafter, the formed glass sheet is eventually deposited onto the delivery mold which can move the glass sheet into a quench station having curved quench heads spaced closer than is possible without the glass sheet tilting from its initial attitude. Also, the upper extremities of the lower mold 28 are at generally the same elevation, and each upper extremity is located no less than about 0.2 centimeter and not more than about 2 centimeters, and preferably no more than about 0.6 centimeter, below the glass sheet G just before the glass sheet is released from the transfer platen 34 onto the lower mold.

Controller 18 can also operate the system so that the first actuator 38 operates the transfer platen 34 so that it receives the heated glass sheet G from the roll conveyor 24 while the glass sheet is stationary or while the glass sheet is being conveyed.

It is also possible for the transfer platen 34 to be moved downwardly a slight extent at its opposite extremes of travel within the furnace 12 and the forming station 14. Such downward movement positions the transfer platen 34 closer to the roll conveyor 24 to facilitate the initial transfer of the glass sheet to the transfer platen in the furnace. In the forming station 14, the downward movement reduces the drop height of the glass sheet from the transfer platen 34 to the lower mold 28.

While the preferred embodiment of the invention has been illustrated and described, it is not intended that this embodiment illustrates and describes all possible forms of the invention. Rather, the words used in the specification are words of description rather than limitation, and it is understood that various changes may be made without departing from the spirit and scope of the invention as defined by the following claims.

What is claimed is:

1. A glass sheet forming system comprising:
   a furnace having a heating chamber;
   a horizontal conveyor located within the heating chamber of the furnace to convey glass sheets through the furnace along a direction of conveyance for heating to a forming temperature;
   a forming station for cyclically forming heated glass sheets and including a lower mold of the ring type and an upper mold located above the lower mold and having a downwardly facing full surface forming face at which a vacuum can be drawn;
   a vacuum transfer platen mounted for horizontal movement and having a downwardly facing surface at which a vacuum is drawn to receive and support a heated glass sheet in contact with the downwardly facing surface;
   a first actuator that moves the vacuum transfer platen horizontally between (a) a receiving position within the furnace above the conveyor from which the downwardly facing surface of the vacuum transfer platen receives and supports a heated glass sheet in contact therewith, and (b) a delivery position within the forming station below the upper mold and above the lower mold to deliver the heated glass sheet onto the lower mold;

a second actuator that moves the upper mold upwardly and downwardly, the second actuator moving the upper mold upwardly so the vacuum transfer platen can be moved to the delivery position to deliver the heated glass sheet onto the lower mold, the vacuum transfer platen then being moved by the first actuator back to the receiving position within the furnace and the second actuator moving the upper mold downwardly to cooperate with the lower mold in press forming the heated glass sheet, and the second actuator subsequently moving the upper mold upwardly while the upper mold supports the formed glass sheet by vacuum drawn at its downwardly facing full surface forming face;

a delivery mold movable horizontally at an elevation above the elevation of the vacuum transfer platen and below the elevation of the upwardly moved upper mold;

a third actuator for initially moving the delivery mold to the forming station to receive the formed glass sheet from the upwardly moved upper mold and for subsequently moving the delivery mold and the formed glass sheet from the forming station for delivery; and a controller for controlling the actuators so the movement of the vacuum transfer platen into the forming station begins before the delivery mold is fully moved out of the forming station such that both the vacuum transfer platen and the delivery mold as well as the glass sheets thereon are at least partially in the forming station at the same time and respectively in underlapping and overlapping relationships with respect to each other whereby one cycle commences within the forming station before the prior cycle is completed to decrease glass sheet forming cycle time.

2. A glass sheet forming system as in claim 1 and further including a quench station to which the formed glass sheet is delivered by the delivery mold for quenching.

3. A glass sheet forming system as in claim 1 wherein the furnace includes a lift jet nozzle assembly for lifting the heated glass sheet from the conveyor to the downwardly facing surface of the vacuum transfer platen.

4. A glass sheet forming system as in claim 1 wherein the downwardly facing surface of the vacuum transfer platen has a slight downwardly convex shape and includes a high temperature cloth covering against which the heated glass sheet is supported for its transfer from the furnace to the forming station.

5. A glass sheet forming system as in claim 1 wherein the forming station includes a heated forming chamber in fluid communication with the heating chamber of the furnace.

6. A glass sheet forming system as in claim 1 further including a lower mold tilt support mechanism.

7. A glass sheet forming system as in claim 1 wherein the controller operates the vacuum transfer platen to deliver the heated glass sheet to the lower mold at approximately the same time the upper mold releases the formed glass sheet from the prior cycle onto the delivery mold.

8. A glass sheet forming system as in claim 1 wherein the controller operates the system so the vacuum transfer platen can receive the heated glass sheet from the conveyor while the glass sheet is stationary or while the glass sheet is being conveyed.

9. A glass sheet forming system as in claim 1 wherein the controller operates the system so the full surface mold is moved downwardly to deliver the formed glass sheet onto the delivery mold and then moved back upwardly so the delivery mold can be moved from the forming station for delivery.

10. A glass sheet forming system as in claim 1 wherein the lower mold has upper extremities that are located no less than about 0.2 centimeter and no more than about 2 centimeters below the glass sheet just before the glass sheet is released from the vacuum transfer platen onto the lower mold.

11. A glass sheet forming system in claim 1 wherein the lower mold has upper extremities that are located no less than about 0.2 centimeter and no more than about 0.6 centimeter below the glass sheet just before the glass sheet is released from the vacuum transfer platen onto the lower mold.

12. A glass sheet forming system comprising:

a furnace having a heating chamber;

a horizontal conveyor located within the heating chamber of the furnace to convey glass sheets through the furnace along a direction of conveyance for heating to a forming temperature;

a forming station for cyclically forming heated glass sheets, the forming station including a heated forming chamber in fluid communication with the heating chamber of the furnace, the forming station including a lower mold and an upper mold within the heated forming chamber, the lower mold being of the ring type and including a tilt support mechanism, and the upper mold being located above the lower mold and having a downwardly facing full surface forming face at which a vacuum is selectively drawn;

a vacuum transfer platen including a downwardly facing surface at which a vacuum can be drawn to receive and support a glass sheet in contact with the downwardly facing surface, and the downwardly facing surface of the vacuum transfer platen having a slight downwardly convex shape and including a high temperature cloth covering;

a first actuator that moves the vacuum transfer platen between (a) a receiving position within the furnace above the conveyor from which the downwardly facing surface of the vacuum transfer platen receives a heated glass sheet from the conveyor while the glass sheet is stationary or being conveyed, and the vacuum transfer platen supporting the glass sheet received from the conveyor in contact with its downwardly facing surface and (b) a delivery position within the forming station below the upper mold and above the lower mold to deliver the heated glass sheet to the lower mold;

a lift jet nozzle assembly for lifting the heated glass sheet from the conveyor to the downwardly facing surface of the vacuum transfer platen;

a second actuator that moves the upper mold upwardly and downwardly, the second actuator moving the upper mold upwardly so the vacuum transfer platen can be moved to the delivery position to deliver the heated glass sheet onto the lower mold, the vacuum transfer platen then being moved by the first actuator back to the receiving position within the furnace and the second actuator moving the upper mold downwardly to cooperate with the lower mold in press forming the heated glass sheet, and the second actuator subsequently moving the upper mold upwardly while the upper mold supports the formed glass sheet by vacuum drawn at its downwardly facing full surface forming face;

a delivery mold movable horizontally at an elevation above the elevation of the vacuum transfer platen and below the elevation of the upwardly moved upper mold so the vacuum transfer platen and the delivery mold can be located in the forming station at the same time to decrease glass sheet forming cycle time;

a third actuator for initially moving the delivery mold from the quench station to the forming station below the formed glass sheet on the upwardly moved upper mold which is then moved downwardly by the second actuator to deliver the formed glass sheet to the delivery mold, the second actuator then moving the upper mold upwardly and the third actuator moving the delivery mold and the formed glass sheet thereon from the forming station; and a controller for controlling the actuators so the movement of the vacuum transfer platen into the forming station begins before the delivery mold is fully moved out of the forming station such that both the vacuum transfer platen and the delivery mold as well as the glass sheets thereon are at least partially in the forming station at the same time and respectively in underlapping and overlapping relationships with respect to each other whereby one cycle commences within the forming station before the prior cycle is completed to decrease glass sheet forming cycle time.

13. A glass sheet forming system comprising:

a furnace having a heating chamber;

a horizontal conveyor located within the heating chamber of the furnace to convey glass sheets through the furnace along a direction of conveyance for heating to a forming temperature;

a forming station for cyclically forming heated glass sheets and including a lower mold of the ring type and an upper mold located above the lower mold and having a downwardly facing full surface forming face at which a vacuum can be drawn;

a vacuum transfer platen mounted for horizontal movement and having a downwardly facing surface at which a vacuum is drawn to receive and support a heated glass sheet in contact with the downwardly facing surface, and the downwardly facing surface of the transfer platen having a slight downwardly convex shape and including a high temperature cloth covering against which the heated glass sheet is supported;

a first actuator that moves the vacuum transfer platen horizontally between (a) a receiving position within the furnace above the conveyor from which the downwardly facing surface of the vacuum transfer platen receives and supports a heated glass sheet in contact therewith, and (b) a delivery position within the forming station below the upper mold and above the lower mold to deliver the heated glass sheet onto the lower mold;

the furnace also including a lift jet assembly for lifting the heated glass sheet from the conveyor to the downwardly facing surface of the vacuum transfer platen;

a second actuator that moves the upper mold upwardly and downwardly, the second actuator moving the upper mold upwardly so the vacuum transfer platen can be moved to the delivery position to deliver the heated glass sheet onto the lower mold, the vacuum transfer platen then being moved by the first actuator back to the receiving position within the furnace and the second actuator moving the upper mold downwardly to cooperate with the lower mold in press forming the heated glass sheet, and the second actuator subsequently moving the upper mold upwardly while the upper mold supports the formed glass sheet by vacuum drawn at its downwardly facing full surface forming face;

a delivery mold movable horizontally at an elevation above the elevation of the vacuum transfer platen and below the elevation of the upwardly moved upper mold;

a third actuator for initially moving the delivery mold to the forming station to receive the formed glass sheet from the upwardly moved upper mold and for subsequently moving the delivery mold and the formed glass sheet from the forming station for delivery; and a controller for controlling the actuators so the movement of the vacuum transfer platen from the furnace into the forming station begins before the delivery mold is fully moved out of the forming station such that both the vacuum transfer platen and the delivery mold as well as the glass sheets thereon are at least partially in the forming station at the same time and respectively in underlapping and overlapping relationships with respect to each other whereby one cycle commences within the forming station before the prior cycle is completed to decrease glass sheet forming cycle time.

14. A glass sheet forming system comprising:

a furnace having a heating chamber;

a horizontal conveyor located within the heating chamber of the furnace to convey glass sheets through the furnace along a direction of conveyance for heating to a forming temperature;

a forming station for cyclically forming heated glass sheets and including a lower mold of the ring type and an upper mold located above the lower mold and having a downwardly facing full surface forming face at which a vacuum can be drawn;

a tilt mechanism for the lower mold;

a vacuum transfer platen mounted for horizontal movement and having a downwardly facing surface at which a vacuum is drawn to receive and support a heated glass sheet in contact with the downwardly facing surface, and the downwardly facing surface of the transfer platen having a slight downwardly convex shape and including a high temperature cloth covering against which the heated glass sheet is supported;

a first actuator that moves the vacuum transfer platen horizontally between (a) a receiving position within the furnace above the conveyor from which the downwardly facing surface of the vacuum transfer platen receives and supports a heated glass sheet in contact therewith, and (b) a delivery position within the forming station below the upper mold and above the lower mold to deliver the heated glass sheet onto the lower mold;

the furnace also including a lift jet assembly for lifting the heated glass sheet from the conveyor to the downwardly facing surface of the vacuum transfer platen;

a second actuator that moves the upper mold upwardly and downwardly, the second actuator moving the upper mold upwardly so the vacuum transfer platen can be moved to the delivery position to deliver the heated glass sheet onto the lower mold, the vacuum transfer platen then being moved by the first actuator back to the receiving position within the furnace and the second actuator moving the upper mold downwardly to cooperate with the lower mold in press forming the heated glass sheet, and the second actuator subsequently moving the upper mold upwardly while the upper mold supports the formed glass sheet by vacuum drawn at its downwardly facing full surface forming face;

a delivery mold movable horizontally at an elevation above the elevation of the vacuum transfer platen and below the elevation of the upwardly moved upper mold;

a third actuator for initially moving the delivery mold to the forming station to receive the formed glass sheet from the upwardly moved upper mold and for subsequently moving the delivery mold and the formed glass sheet from the forming station for delivery;

a controller for controlling the actuators so the movement of the vacuum transfer platen from the furnace into the forming station begins before the delivery mold is fully moved out of the forming station such that both the vacuum transfer platen and the delivery mold as well as the glass sheets thereon are at least partially in the forming station at the same time and respectively in underlapping and overlapping relationships with respect to each other whereby one cycle commences within the forming station before the prior cycle is completed to decrease glass sheet forming cycle time; and a quench station to which the formed glass sheet is delivered by the delivery mold for quenching.

* * * * *